US008810967B2

(12) United States Patent
Ramakrishnan et al.

(10) Patent No.: US 8,810,967 B2
(45) Date of Patent: Aug. 19, 2014

(54) DEVICES AND METHODS FOR REDUCING LUBRICANT ACCUMULATION ON SLIDERS

(75) Inventors: Narayanan Ramakrishnan, Bloomington, MN (US); Ajaykumar Rajasekharan, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 19 days.

(21) Appl. No.: 13/553,072

(22) Filed: Jul. 19, 2012

(65) Prior Publication Data
US 2014/0022672 A1 Jan. 23, 2014

(51) Int. Cl.
*G11B 5/60* (2006.01)

(52) U.S. Cl.
USPC ...................................... 360/235.5

(58) Field of Classification Search
CPC ...... G11B 5/60; G11B 5/6005; G11B 5/6064; G11B 5/6082
USPC ...................... 360/235.4–236.1, 236.4–236.8
See application file for complete search history.

(56) References Cited

U.S. PATENT DOCUMENTS

| | | | |
|---|---|---|---|
| 5,853,959 A | 12/1998 | Brand et al. | |
| 6,101,066 A * | 8/2000 | Ishihara et al. | 360/236.6 |
| 6,356,405 B1 | 3/2002 | Gui et al. | |
| 6,466,410 B2 * | 10/2002 | Polycarpou et al. | 360/236.6 |
| 6,483,667 B1 * | 11/2002 | Berg et al. | 360/235.6 |
| 6,515,831 B1 * | 2/2003 | Sannino et al. | 360/235.6 |
| 6,556,381 B2 * | 4/2003 | Kohira et al. | 360/236.3 |
| 6,611,400 B1 | 8/2003 | Polycarpou et al. | |
| 6,747,847 B2 | 6/2004 | Stoebe et al. | |
| 7,209,323 B2 | 4/2007 | Boutaghou et al. | |
| 7,255,636 B2 * | 8/2007 | Hu et al. | 360/235.4 |
| 2002/0048120 A1 * | 4/2002 | Boutaghou et al. | 360/236.3 |
| 2002/0075599 A1 * | 6/2002 | Rao et al. | 360/235.7 |
| 2003/0058578 A1 * | 3/2003 | Boutaghou et al. | 360/235.8 |
| 2003/0081352 A1 * | 5/2003 | Rao et al. | 360/235.4 |
| 2009/0219651 A1 | 9/2009 | Zheng et al. | |
| 2010/0226035 A1 | 9/2010 | Huang et al. | |
| 2011/0096441 A1 * | 4/2011 | Kunkel et al. | 360/246.2 |
| 2011/0141622 A1 * | 6/2011 | Takeuchi | 360/235.4 |

OTHER PUBLICATIONS

Bruno Marchon, A model for lubricant flow from disk to slider, IEEE Transactions on Magnetics, Sep. 2003, 2447-49, vol. 39, No. 5.
Qing Dai, Modeling the washboard effect at the head/disk interface, Journal of Applied Physics, Jul. 1, 2004, vol. 96, No. 1.
Jianhua Li, Simulation on contact between the droplet and the slider at head-disk interface based on water-hammer pressure model, Microsystems Tech., Dec. 20, 2008.
Rohit Ambekar, Lubricant Depletion and Disk-to-Head Lubricant Transfer at the Head-Disk Interface in Hard Disk Drives, Journal of Tribology, Jul. 2009, vol. 131, Issue 3.

* cited by examiner

*Primary Examiner* — Nathan Danielsen
(74) *Attorney, Agent, or Firm* — Braden Katterheinrich

(57) ABSTRACT

In certain embodiments, a slider includes an air bearing surface having a cavity. The cavity includes transition features at an upstream side of the cavity to mitigate air flow expansion along the cavity. Turbulence-inducing features are positioned on the transition features.

19 Claims, 6 Drawing Sheets

DEVICES AND METHODS FOR REDUCING LUBRICANT ACCUMULATION ON SLIDERS

SUMMARY

Certain embodiments of the present invention are generally directed to devices and methods for reducing lubricant accumulation on sliders.

In certain embodiments, a slider includes an air bearing surface having a cavity. The cavity includes transition features at an upstream side of the cavity to mitigate air flow expansion along the cavity. Turbulence-inducing features are positioned on the transition features.

DETAILED DESCRIPTION

The present disclosure relates to devices, systems, and methods for reducing lubricant accumulation on sliders. Lubricants are used on rotatable storage media and sliders within disc drives to protect storage media and sliders from physical and chemical damage. Lubricants used for storage media can include bonded and non-bonded portions. The non-bonded or mobile) portion of the lubricant replenishes regions on the media where the lubricant may have become depleted. However, the mobile portion also can migrate from the media to the slider and then accumulate at regions on the slider.

One mechanism of media-to-slider lubricant transfer and accumulation is a result of suction cavities in slider designs utilizing sub-ambient pressure. The presence of a sub-ambient pressure cavity can cause a backflow in an upstream direction towards the cavity because pressure at the trailing edge of the slider is at ambient—by definition, a higher pressure. The backflow can combine with main flow to form regions of flow stagnation, that is, where flow is at or near zero. Transferred lubricant tends to accumulate at these flow stagnation points. As a result, accumulated lubricant can interfere with the slider's flying characteristics, causing read/write errors and/or reduced data throughput, among other things.

Some attempts to mitigate lubricant accumulation have utilized trenches at stagnation points that "trap" lubricant and limit lubricant from flowing back and forth through the region and interfering with read/write elements. However, these attempts do not attack the underlying problem: flow stagnation.

Certain embodiments of the present disclosure are accordingly directed to devices and methods for reducing flow stagnation on sliders.

Figure 1:
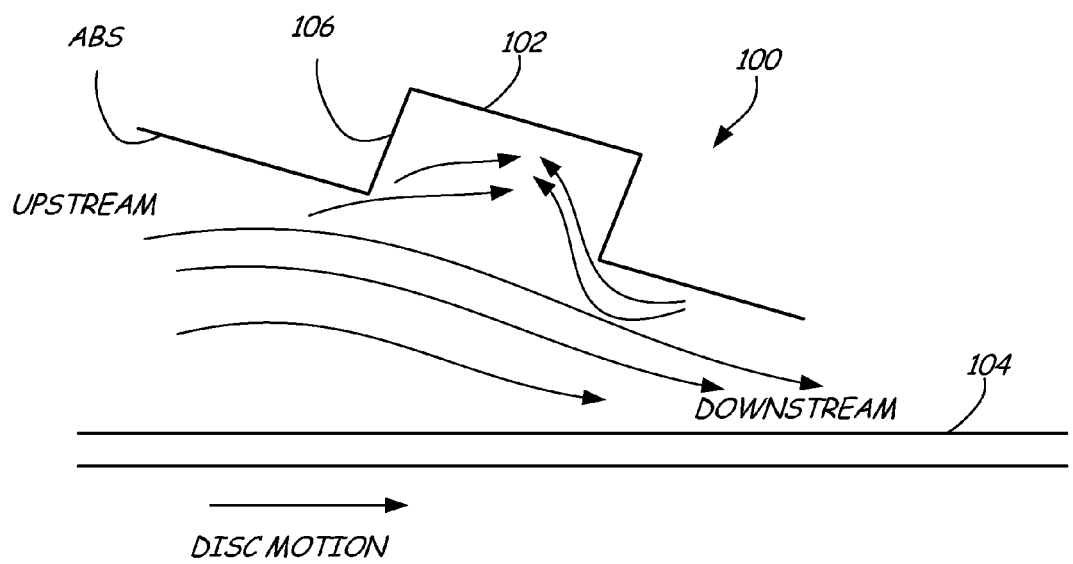
FIG. 1 provides a side view of a portion of a slider profile.
Figure 2:
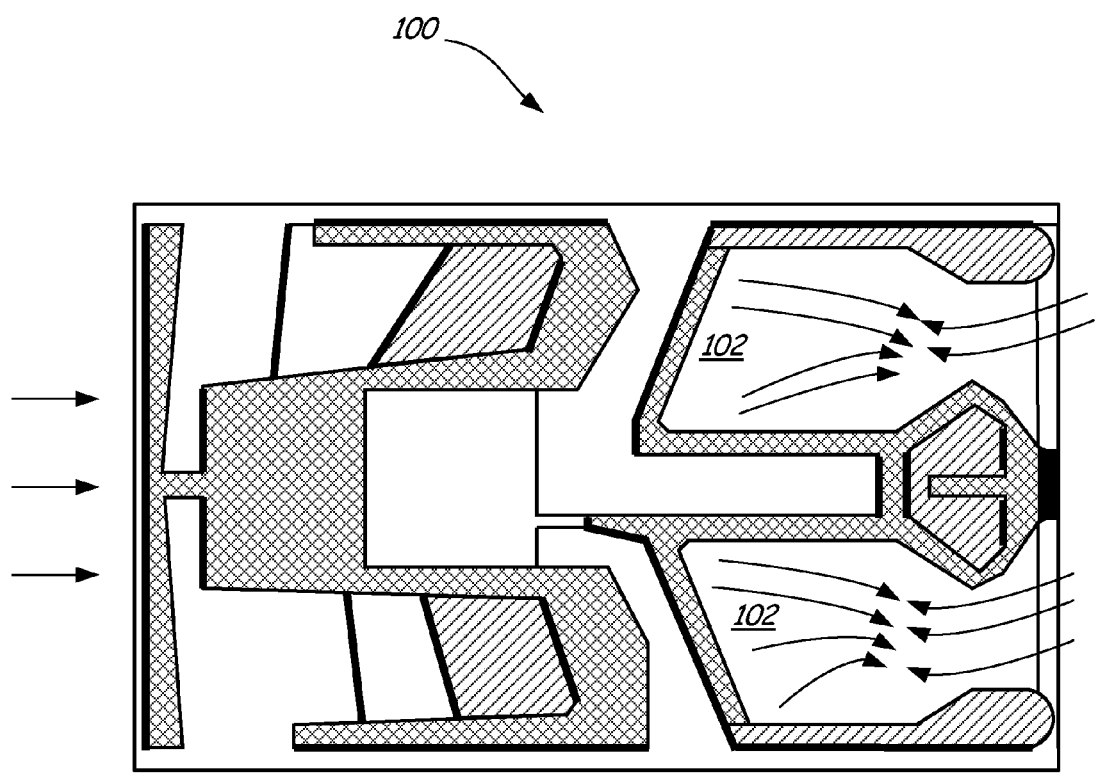
FIG. 2 provides a bottom view of the slider of FIG. 1.

FIG. 1 shows a profile of a portion of an air-bearing surface (ABS) of a slider 100 having a sub-ambient cavity 102. FIG. 2 shows a bottom side of the slider 100 and cavity 102. As the slider 100 flies above a storage medium 104, a main flow of air flows over the ABS from a leading edge (upstream) to a trailing edge (downstream). At the same time, some air flows in an opposite direction of the main flow, from the trailing edge towards the leading edge—the backflow. As the main-flow traverses the ABS and reaches the cavity 102 (see FIG. 2), the airflow expands or diffuses into the cavity 102 across an upstream vertical wall 106 of the cavity 102. This expansion can result in sudden and rapid deceleration of the main-flow and possibly separation of a boundary layer along walls of the cavity 102. The deceleration and separation can be exacerbated in the presence of the backflow across the trailing edge—a condition shown in both FIGS. 1 and 2. As a result, the possibility of flow stagnation is increased, which also increases the possibility of lubricant accumulation portions of the sub-ambient cavity.

Figure 3:
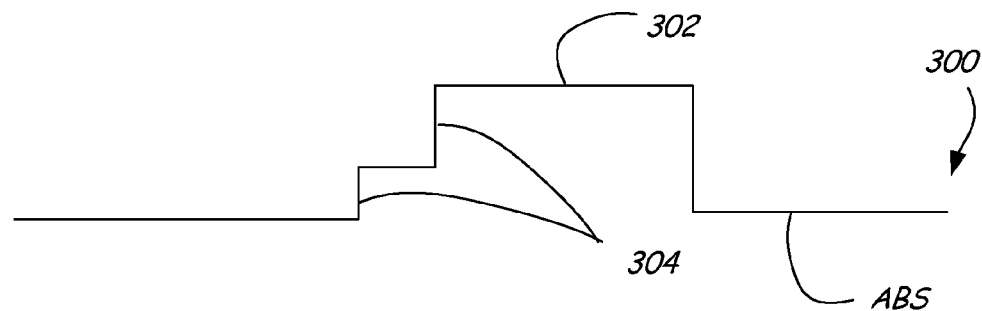
FIG. 3 provides a side view of a profile of a slider, in accordance with certain embodiments of the present disclosure.

FIG. 3 shows a profile of a portion of an air-bearing surface (ABS) of a slider 300. The slider 300 has a sub-ambient cavity 302 with transition features 304 at an upstream side of the cavity 302. The transition features 304 provide a gradual diffusion of main air flow along the slider 300. As such, the transition features 304 may reduce boundary layer separation at slider walls and may reduce a loss of main flow momentum typically associated with previous cavity designs. Reduced separation and momentum loss in the cavity 302 decreases the chance of stagnation zones forming in the cavity 302. As shown in FIG. 3 and following figures, transition features can have an array of designs, such as steps, slopes, and curves, among other geometries.

Figure 4:
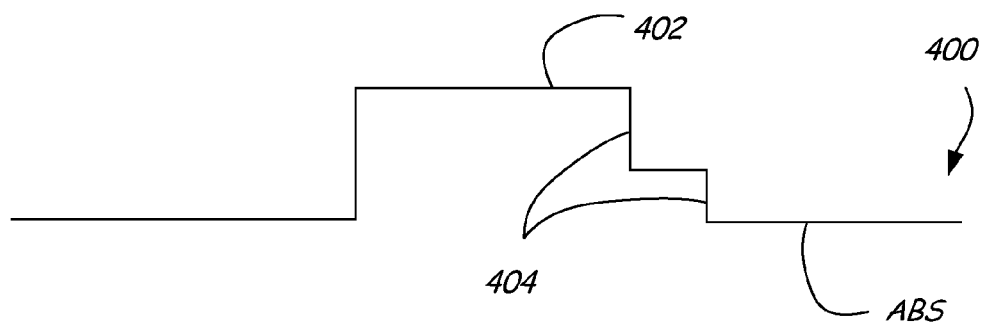
FIG. 4 provides a side view of a profile of a slider, in accordance with certain embodiments of the present disclosure.
Figure 5:
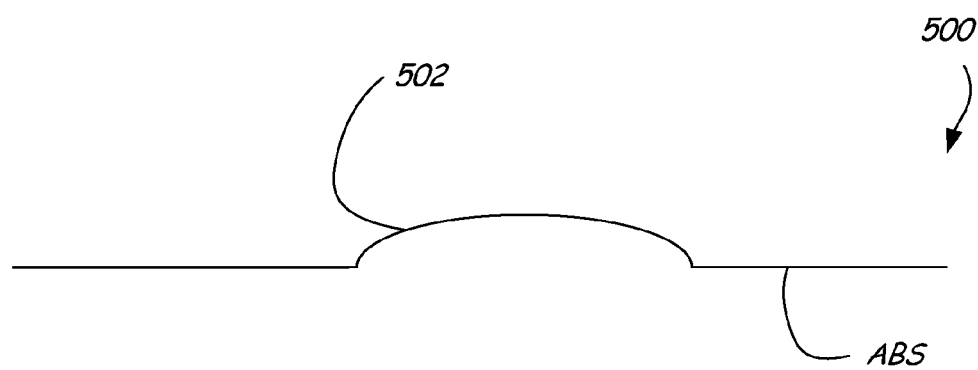
FIG. 5 provides a side view of a profile of a slider, in accordance with certain embodiments of the present disclosure.
Figure 6:
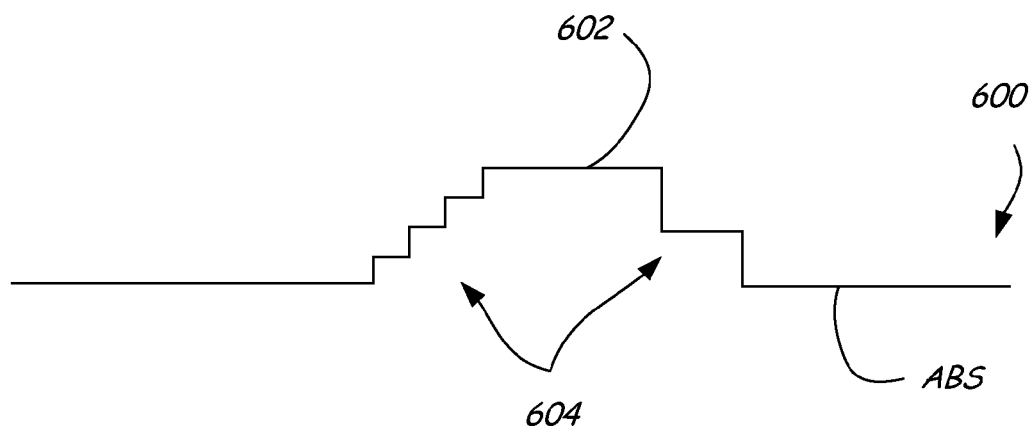
FIG. 6 provides a side view of a profile of a slider, in accordance with certain embodiments of the present disclosure.

FIGS. 4-6 provide embodiments of slider designs using similar concepts described with respect to FIG. 3. FIG. 4 shows a profile of a portion of an ABS of a slider 400 having a sub-ambient cavity 402. The cavity 402 has transitions features at a downstream side of the cavity 402. Here, the transition features 404 provide a gradual diffusion of backflow, thereby reducing the effect of backflow in the cavity 402. The transition features 404 are shown as steps, but can be other geometries. FIG. 5 shows a profile of a portion of an ABS of a slider 500 having a sub-ambient cavity 502 that is curved to provide gradual diffusion of main- and backflow. FIG. 6 shows a profile of a portion of an ABS of a slider 600 having a sub-ambient cavity 602. The cavity 602 has transition features 604 at upstream and downstream sides—each side having features 604 with differing graduations of steps. Transition features can include any number or possibilities of geometries, although not all the possibilities are specifically shown in the figures.

Figure 7:
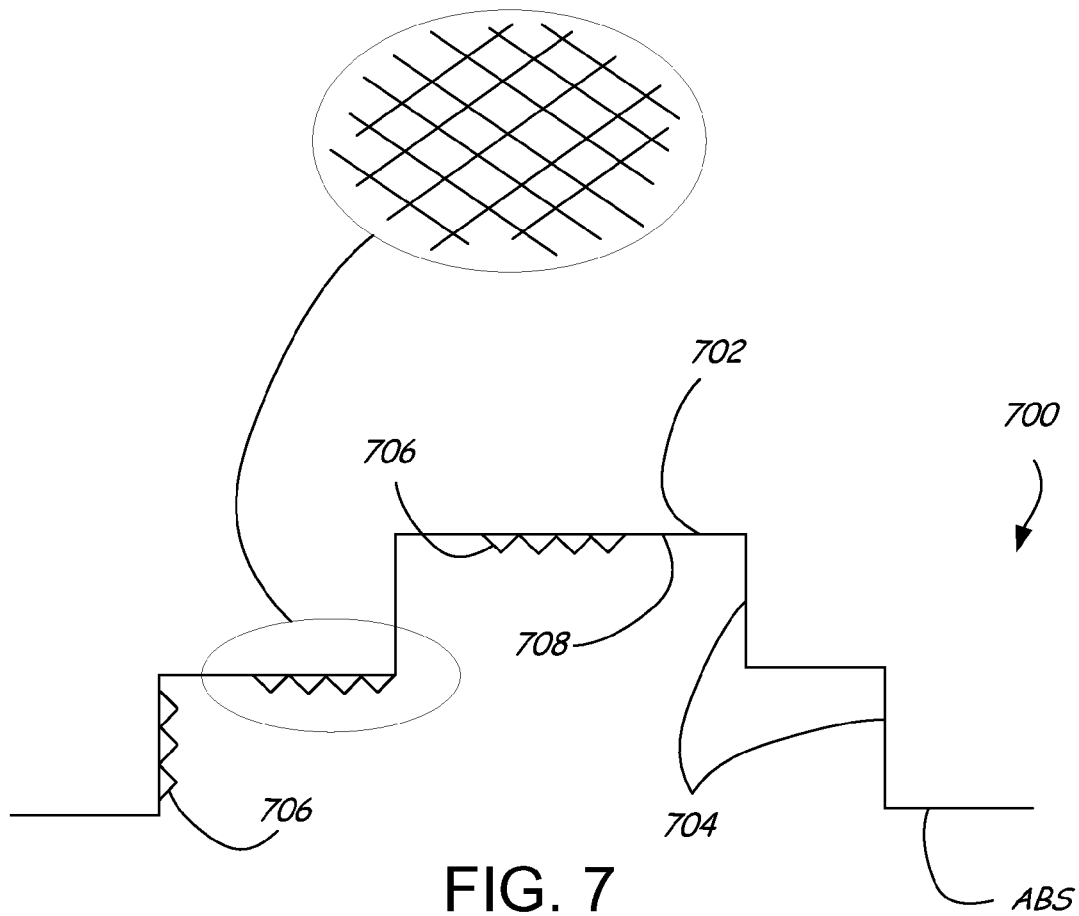
FIG. 7 provides a side view of a profile of a slider, in accordance with certain embodiments of the present disclosure.

FIG. 7 shows a profile of a portion of an ABS of a slider 700 having a sub-ambient cavity 702 with transition features 704. The transition features 704 have turbulence- or vortex-inducing features 706. The turbulence-inducing features 706 can be textured or roughened portions of the transition features 704.

Figure 8:
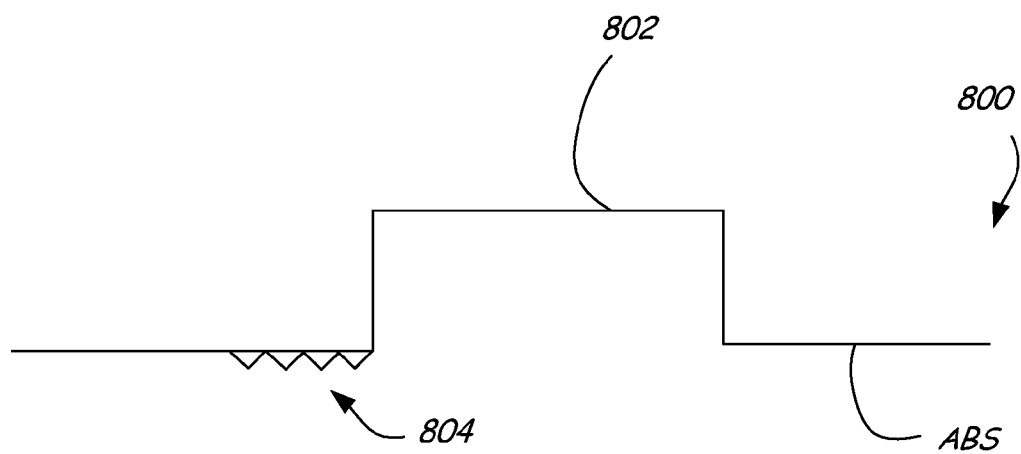
FIG. 8 provides a side view of a profile of a slider, in accordance with certain embodiments of the present disclosure.

Textured features could include alternating grooves and ridges, for example. Roughened features could include portions of a surface having a higher surface roughness than the surrounding portions of the surface. The turbulence-inducing features 706 can be positioned at multiple locations within the cavity 702, for example, on the transition features 704 or on a cavity floor 708. As air flows over the turbulence-inducing features 706, the boundary layer of the flow becomes turbulent, which facilitates large-scale momentum transfer from high-shear layers close to a rotating disc to layers close to walls of the cavity 702. This momentum transfer permits the momentum of the main flow to prevail over a larger portion of the cavity 702 and therefore reduce the possibility of flow stagnation zones within the cavity 702. FIG. 8 shows a profile of a portion of an ABS of a slider 800 having a sub-ambient cavity 802. Turbulence-inducing features 804 are located directly upstream of the cavity 802 to induce turbulence of main flow as it enters the cavity 802.

Figure 9A:
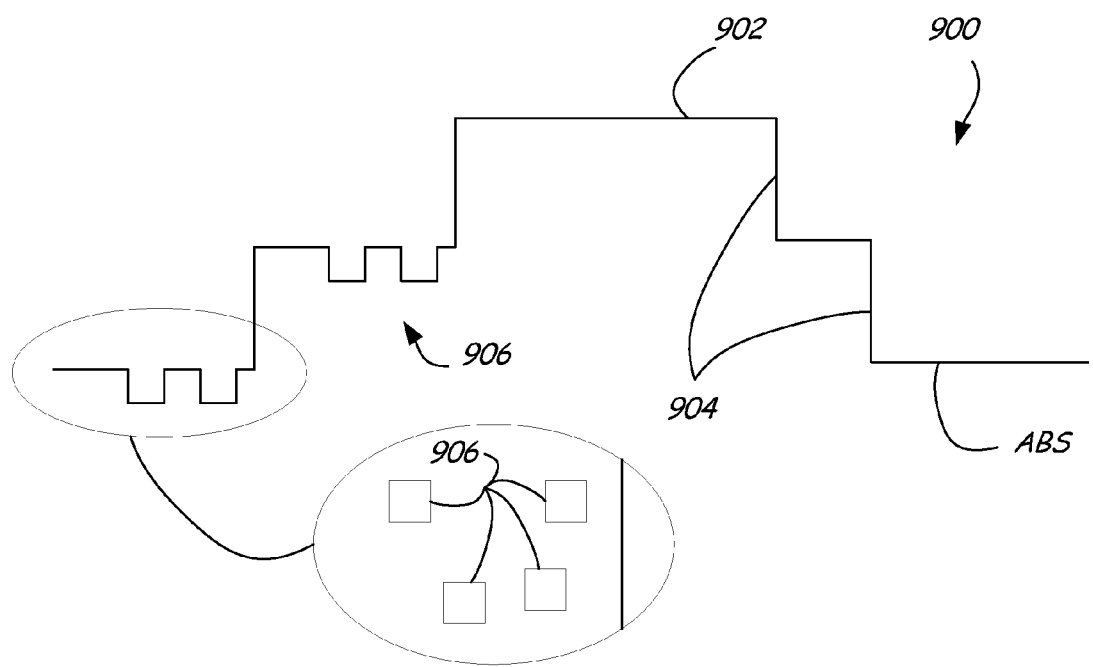
FIG. 9A provides a side view of a profile of a slider, in accordance with certain embodiments of the present disclosure.
Figure 9B:
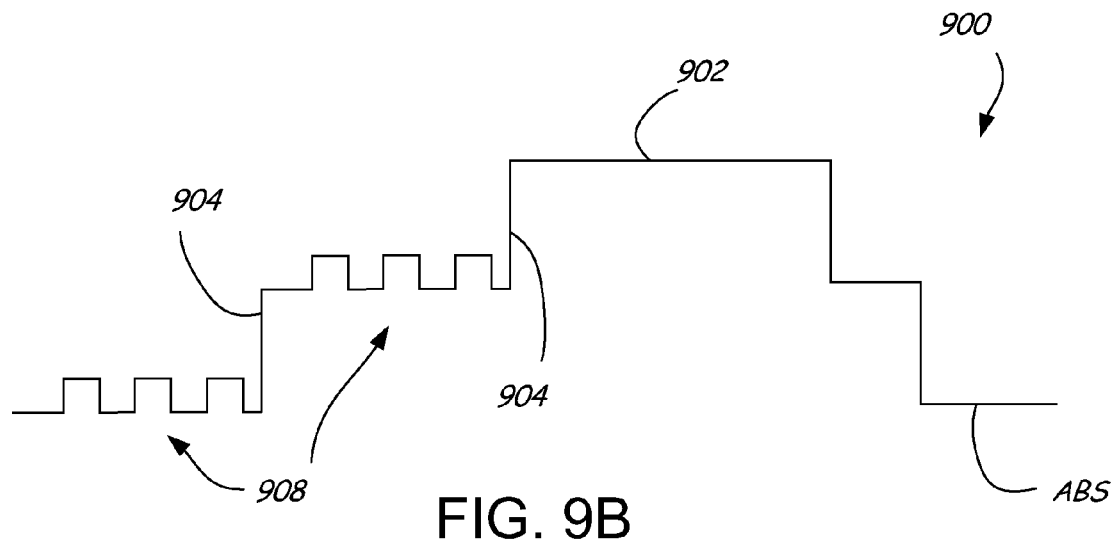
FIG. 9B provides a side view of a profile of a slider, in accordance with certain embodiments of the present disclosure.

FIGS. 9A and 9B show a profile of portion of an ABS of a slider 900 having a sub-ambient cavity 902 with transition features 904. Turbulence-inducing features are located directly upstream of the cavity and also located on the transition features 904. As shown in FIG. 9, the turbulence-inducing are protuberances 906. As shown in FIG. 10, the turbulence-inducing are micro-cavities 908. The turbulence-inducing features can be formed by milling or etching, among other methods used for slider manufacturing processes. The characteristics, geometries, and locations of the turbulence-inducing features can be optimized for different slider designs. For example, in certain embodiments and shown in FIG. 9B, the turbulence-inducing features are arranged in a randomized distribution to enhance turbulent mixing of the main flow within the cavity.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A slider comprising:
    an air bearing surface having a cavity, the cavity including transition features at an upstream side of the cavity to mitigate air flow expansion along the cavity; and
    turbulence-inducing features positioned on the transition features at the upstream side of the cavity.

2. The slider of claim 1, wherein the transition features are steps.

3. The slider of claim 1, further comprising transition features at a downstream side of the cavity.

4. The slider of claim 3, further comprising turbulence-inducing features positioned on the transition features at the downstream side of the cavity.

5. The slider of claim 1, wherein the turbulence-inducing features are protuberances.

6. The slider of claim 1, wherein the turbulence-inducing features are micro-cavities.

7. The slider of claim 1, wherein the turbulence-inducing features have a surface roughness greater than the rest of the bottom side of the slider.

8. The slider of claim 1, further comprising:
    turbulence-inducing features positioned on the cavity floor.

9. The slider of claim 1, wherein the cavity is a sub-ambient cavity.

10. The slider of claim 1, wherein the turbulence-inducing features are located on a bottom cavity surface and are textured.

11. A slider comprising:
    a bottom side wherein a portion of the bottom side defines a cavity, the cavity including transition features at an upstream side of the cavity to mitigate air flow expansion along the cavity; and
    turbulence-inducing features positioned on the bottom side immediately upstream of the cavity.

12. The slider of claim 11, further comprising:
    transition features at a downstream side of the cavity.

13. The slider of claim 11, wherein the transition features are steps.

14. The slide of claim 13, further comprising:
    turbulence-inducing features positioned on the transition features at the upstream side of the cavity.

15. The slider of claim 11, further comprising:
    turbulence-inducing features positioned on a floor of the cavity.

16. The slider of claim 11, wherein the turbulence-inducing features are protuberances.

17. The slider of claim 11, wherein the turbulence-inducing features are micro-cavities.

18. The slider of claim 11, wherein the turbulence-inducing features have a surface roughness greater than the rest of the bottom side of the slider.

19. A slider comprising:
    a sub-ambient cavity;
    means for reducing air flow expansion along a downstream direction of the sub-ambient cavity; and
    means for inducing turbulence within the sub-ambient cavity, wherein the means for inducing turbulence is positioned in the cavity.

* * * * *